United States Patent [19]

Gogarty

[11] Patent Number: 4,638,994
[45] Date of Patent: Jan. 27, 1987

[54] QUICK-BOLT LOCKING SYSTEM

[76] Inventor: Brian J. Gogarty, 5348 N. Magnolia, Chicago, Ill. 60640

[21] Appl. No.: 636,121

[22] Filed: Jul. 30, 1984

[51] Int. Cl.⁴ ............................................. A63B 11/00
[52] U.S. Cl. .................................. 272/122; 403/343; 403/261; 411/417
[58] Field of Search ............... 272/122, 123, 116, 117, 272/93; 403/343, 328, 105; 411/417, 418, 411, 349; 403/261, 260, 256, 348

[56] References Cited

U.S. PATENT DOCUMENTS

| | | | |
|---|---|---|---|
| 1,316,683 | 9/1919 | Calvert | 272/122 |
| 1,991,520 | 2/1935 | Postl | 272/122 |
| 2,379,984 | 7/1945 | Nereaux | 403/348 X |
| 2,500,299 | 3/1950 | Spitzkeit | 403/343 |
| 3,099,509 | 7/1963 | Duenke | 403/343 X |
| 3,161,395 | 12/1964 | Carter | 403/105 X |
| 3,488,051 | 1/1970 | Papistas-Scherer | 272/122 |
| 3,606,406 | 9/1971 | Walters | 403/261 |
| 3,679,244 | 7/1972 | Reddy | 403/328 X |
| 3,771,785 | 11/1973 | Speyer | 272/123 |
| 4,042,305 | 8/1977 | Vincent | 403/328 X |
| 4,529,197 | 7/1985 | Gogarty | 272/122 |

Primary Examiner—Richard J. Apley
Assistant Examiner—Robert W. Bahr
Attorney, Agent, or Firm—Paul H. Gallagher

[57] ABSTRACT

A tubular main bar, internally threaded, with buttress teeth, from each end, with a stop in the middle, and an inner bar inserted in each end, having a single tooth element, spring pressed radially outwardly, forming a buttress tooth engaging the buttress teeth in the main bar. The inner bars can be pushed inwardly, but must be threaded, or turned, out. The weights are fitted on the inner bar at each end, against the end of the main bar and a locking collar interlocks with the outer end of each inner bar, and holds the weights. The outer surface of the locking collar and of the inner bar lie in a common plane, defining the end of the dumbbell. The inner bars cannot be threaded completely out of the main bar, except by special manipulation of the tooth element in the inner bar, through an inconsipicuous opening.

10 Claims, 11 Drawing Figures

U.S. Patent  Jan. 27, 1987  4,638,994
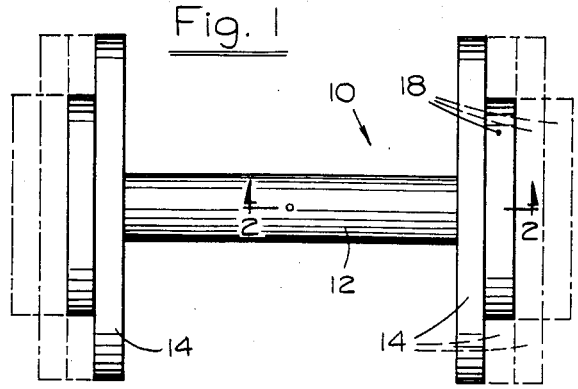
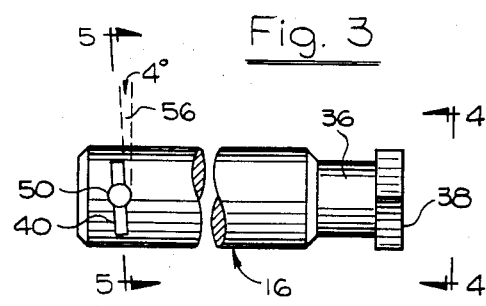
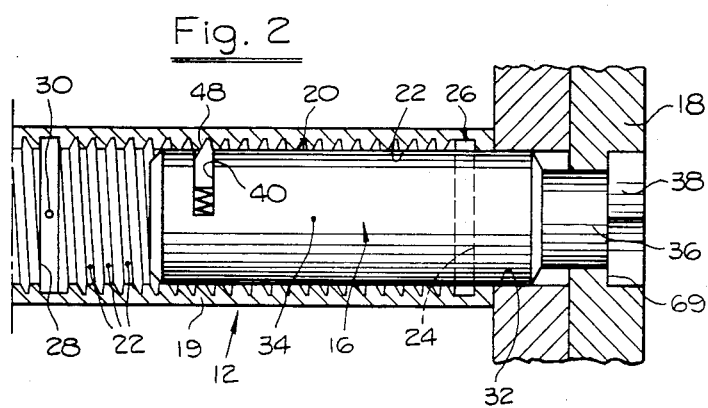
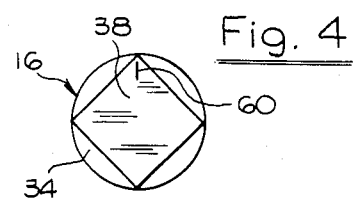
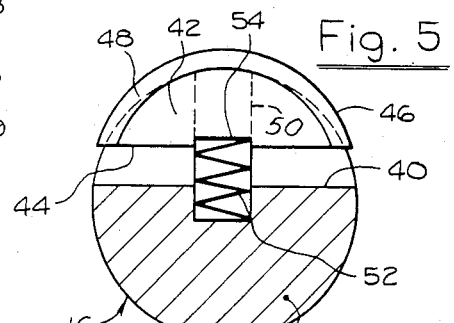
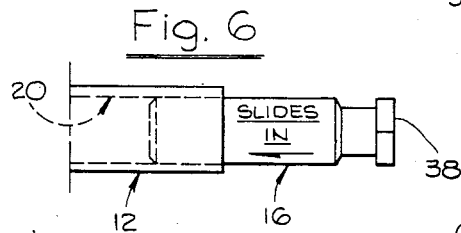
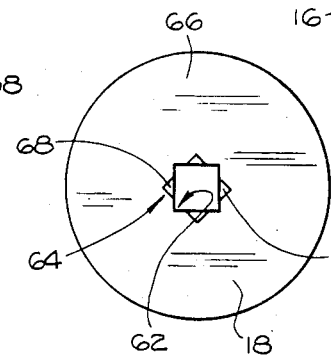
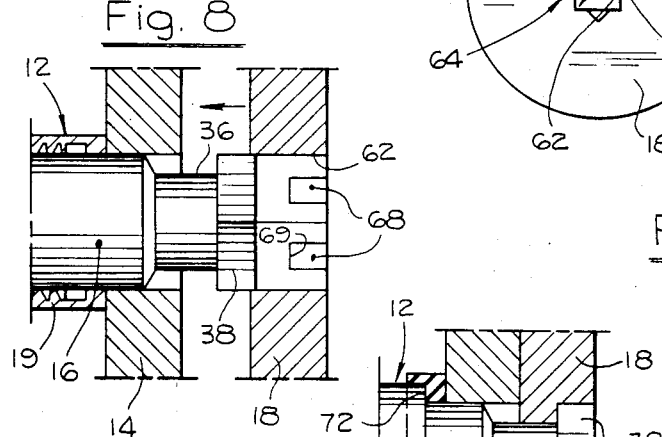
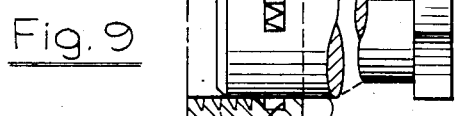
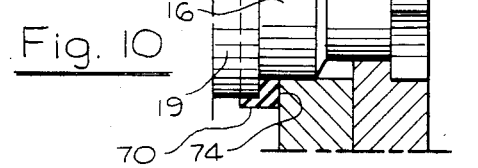
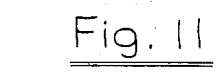

QUICK-BOLT LOCKING SYSTEM

FIELD OF THE INVENTION

The invention resides in the field of adjustable dumbbells, which include a bar and weights on the ends of the bar. Weights are added to and removed from the bar to provide the adjustability. Previously known adjustable dumbbells included irregularly shaped adjusting elements extending beyond the otherwise flat ends of the weights, which rendered it impossible to stand the dumbbells on end, and the ends of the bars and the adjusting elements often were dangerous in that in handling the dumbbells they unexpectedly hit or snagged the people handling them. The locking means for locking the weights on the bars in many cases marred the bars making it difficult to secure the weights in firm and stable position.

OBJECTS OF THE INVENTION

A broad object of the invention is to provide an adjustable dumbbell, and locking means therefor, having the following features and advantages:

1. The end surfaces of the dumbbell, beyond the weights, are flat and without extraneous elements, whereby it is easy to handle and it will stand on end.
2. It can be easily and quickly adjusted to add or remove weights.
3. The bar is of pre-determined length, and remains of such effective length regardless of the number of weights thereon, and the bar throughout its length is of smooth surface and thereby comfortable in the hand.
4. The locking means includes such broad concept as to be especially adapted to use in locking articles together, in cases other than dumbbells.

DESCRIPTION OF A PREFERRED EMBODIMENT

In the drawings,

FIG. 1 is a side view of the dumbbell incorporating the features of the invention;

FIG. 2 is a sectional view taken at line 2—2 of FIG. 1;

FIG. 3 is an elevational side view of the inner bar;

FIG. 4 is an end view taken at line 4—4 of FIG. 3;

FIG. 5 is a sectional view on an enlarged scale taken at line 5—5 of FIG. 3;

FIG. 6 is a fragmentary view of the main bar and the inner bar;

FIG. 7 is an outer face view of a locking collar;

FIG. 8 is a view similar to the right hand end of FIG. 2 but with certain of the elements in different positions;

FIG. 9 is a fragmentary view showing certain relation between the main bar and the inner bar;

FIG. 10 is a view similar to the right hand end of FIG. 2 but showing a slight modification; and FIG. 11 is a cross sectional view at the center of the main bar, showing a modified form of detail construction.

Referring in detail to the accompanying drawings, the dumbbell in its entirety is indicated at 10 and includes as its main components a bar or main bar 12, a plurality of weights 14, an inner bar 16 and a locking collar 18. The various parts of the dumbbell are preferably made of hardened steel, for strength and weight, but an exception exists in connection with a detail element in FIG. 11 as referred to hereinbelow.

The various parts or components may be of any dimensions within a considerable range, but reference is made herein to certain specific dimensions constituting a specific example of a convenient size of dumbbell.

The bar 12 is of tubular construction, having a body 19 provided with specially designed modified buttress teeth 20, forming a continuous thread. The teeth 20 are truncated to provide flat surface edges 22 on their radially inner edges, these edges lying in an inner cylindrical surface, accommodating the inner bar 16, as explained hereinbelow. Adjacent its ends, the bar 12 is provided with inner circumferential grooves 24, and a small pinhole 26 in each groove leading to the exterior for a purpose to be referred to again hereinbelow. The bar 12 is also provided with a central inner circumferential groove 28 across which is a pin 30, preferably at a diameter, acting as a stop means for the inner bars 16 as will be referred to again hereinbelow. The bar 12 is symmetrical about a central transverse plane.

Each weight 14 is provided with a central hole 32 preferably dimensioned for snug sliding engagement with the inner bar 16, but not limited to such dimension. The inner bar 16 includes a body portion 34 constituting the main portion of its length, of cylindrical shape. Adjacent its outer end, the right end of FIG. 2, is a reduced diameter portion 36 and at the outer end is a polygonal head 38, preferably square (FIG. 4). The head 38 in its greatest transverse dimension, diagonally as viewed in FIG. 4, is no greater than the diameter of the body portion 34, but preferably not materially less than that dimension.

The inner bar 16 adjacent its inner end is provided with a transverse groove 40 (FIGS. 2, 3, 5) preferably of a depth less than the radius, and at a certain angle relative to a radius as referred to hereinbelow.

Slidably positioned in the transverse slot 40 is an insert or insert tooth 42 having a radially inner straight edge 44 which is engageable with the floor of the groove 40, and a radially outer curved edge 46 generally circular, and bevelled as at 48 (FIG. 2) to form an inclined buttress tooth surface complementary to the teeth 20. The inner bar 16 is also provided with a diametrical hole 50 (FIG. 3) coincident with and slightly wider than the groove 40 and extending into the floor or the groove. A compression spring 52 is positioned in the hole, engaging the insert 42 and biasing it radially outwardly, the insert having a recess 54 to receive the spring.

In the position of the inner bar 16 in the bar 12, the insert extends into the teeth 20, and forms, in effect, a tooth itself, and upon turning of the inner bar, the insert functions with the teeth 20 to thread the inner bar along the main bar. The inclined edge 48 on the insert is directed axially inwardly, and because of that the inner bar can be inserted into the tubular main bar by a simple sliding action in axial direction, the insert 46 yielding radially inwardly, and snapping past each tooth 20. The flat surfaces 22, as noted, accommodate the inner bar 16, providing a smooth total supporting surface for the inner bar, and solidly supporting it, enabling the inner bar to be easily slid into the main bar. The teeth also withstand deteriorating effects by the insert tooth 46, in snapping over them, maintaining a sliding fit, and a true fit. Because of this, the teeth can be made finer than could be effectively done otherwise. By controlling tool size and thread depth, great surface area can be provided on the teeth. To retract the inner bar 16, it must be turned or threaded out. The relative dimensions are preferably such that in the innermost position of the inner bar, its inner end is adjacent the limit pin 30, which prevents its being moved therebeyond.

The inclination of the groove 40, referred to above, is indicated in FIG. 3. An angle of 4° as indicated at 56, which has been found practical.

In the retraction movement of the inner bar 16, as its inner end reaches the outer end of the main bar, the insert 46 snaps into the groove 24, and prevents the complete withdrawal of the inner bar, in normal use thereof. However, in order to remove the inner bar, a pin 58 (FIG. 9) may be inserted in the pinhole 26, for depressing the insert 46, whereupon the inner bar can be removed completely. It is desired however that the complete removal of the inner bar not be made easy for the regular user. For convenience the head 38 may be provided with an indicator mark 60 (FIG. 4) to facilitate aligning the insert 46 with the pinhole 26.

The locking collar 18 is provided with a central hole 62 of the same shape and dimensions as the head 38 (square), and the locking collar is provided with a socket 64 in its outer surface 66 which consists of recesses 68 produced by forming another hole shaped and dimensioned identical with main hole 62 but displaced therefrom 45° but not extending axially through the locking collar. These recesses therefore form floor elements 69 (FIGS. 2, 7 and 8) against which the head 38 of the inner bar engages in the locking and unlocking steps.

Referring to FIGS. 2 and 8, assuming a first condition in which only the inner bar is in position in the main bar, and no weights are on the bar, a weight is fitted over the outer exposed end of the inner bar and fitted up against the end of the main bar 12. Then the locking collar 18 is fitted over the end of the inner bar, with the head 38 of course in register with the main hole 62, to a position fully beyond the head, and then the locking collar is turned 45° so that the corners of the head are in alignment with the recesses 68, and the locking collar is withdrawn axially, and the head then fits in the socket in a wrench-like position. The socket and head are so dimensioned axially that when the head is in the socket, the outer surfaces of the locking collar and head are flush.

Upon applying the locking collar to the inner bar as just described, and while the locking collar is yet spaced from the weight, the user can move the inner bar fully into position by merely placing his finger against the inner bar and pushing it inwardly, as indicated in FIG. 6, moving the locking collar and inner bar together into assembled position. In this sliding movement, the insert tooth 46 snaps past the teeth 20, as indicated above, and after it is fully moved inwardly, the user then merely turns the locking collar to complete the locking effect, which is only a small fraction of a full rotation, or less than that represented by the spacing between the teeth 20.

To remove any of the weights, the user merely rotates the locking collar 18 to thread the inner bar 16 outwardly sufficient to enable the locking collar to be pushed inwardly, beyond the head, and rotated again 45° to place the head 38 in register with the main hole 62 whereupon the locking collar is simply slid off. Then a weight is removed or placed onto the inner bar, as desired. In the case where weights are added, the inner bar 16 is threaded out a suitably greater distance, before removing the locking collar 18.

Attention is directed to FIG. 10 which shows a slight modification. An adapter collar or ring 70, which may be of plastic so as to provide a relatively resilient cushioning effect, is placed on the end of the main bar 12. The collar 70 is provided with a counterbore 72 for receiving the end of the main bar by a tight friction fit to hold it in place and to discourage its removal, and an outer end surface 74 which is engaged by the weight. Preferably it is dimensioned to normally cover the pinhole 26. It may be used also to accommodate weights with central holes that are of slightly greater diameter than the main bar, the weights then butting directly against the collar.

FIG. 11 shows a modified detail construction which may be used in substitution of the stop pin 30 of FIG. 2. The main bar 12 may be provided with an inner circumferential narrow groove 76 at its center, and a snap ring 78 fitted therein. This snap ring may be put in place and removed by a special tool.

A great advantage of the invention is that the main bar 12 is smooth and uniform throughout its length, substantially up to the weights. This shape may be considered slightly modified in the case of FIG. 10 where the collar 70 is used, but the collar is of small thickness axially. All of the interlocking elements of the main bar 12 and the inner bar 16 are in the interior of the main bar, presenting a smooth outer surface to the complete device. This feature is particularly exemplified by the outer end surface of the dumbbell, formed by the locking collar and head 38, which as noted above, lie in a common plane. The dumbbell can be therefore easily stood on end, and there are no extraneous sharp or irregularly shaped elements that may cause damage, such as hooks, etc., that might snag the body of the person handling the device. The device is adjustable as to the number of weights that may be applied, within a great range. The length of the main bar 12 is preferably about 5¾ inches long, which is a convenient length for even a big hand to hold the dumbbell, and any number of weights may be mounted on each end, within the range accommodated by the effective one-half of the length of the main bar, i.e., that distance between the limit inner and outer positions of the inner bar in the main bar. Still another advantage is that the locking collars 18 may be made of heavy material, if desired, so that they may be used as weights themselves, without the weights 18, for providing a light-weight dumbbell, although in other cases it may be desired to have the locking collars 18 of aluminum, or other light-weight material for ease in handling them.

I claim:
1. An adjustable dumbbell, comprising,
a tubular main bar,
a plurality of weights having central holes therein,
an inner bar at each end of the main bar extending into the main bar, and having its outer end projecting outwardly beyond the main bar,
the holes in the weights being sufficiently large to pass over the outer end of the inner bar, and the longitudinally inner weight at each end bearing against the end of the main bar, and
a locking collar at each end, having a central hole capable of passing over the end of the inner bar, the inner bar and the locking collar being capable of being interlocking for preventing the locking collar from being removed over the inner bar, and
the inner bar and main bar having interlocking elements enabling interlocking the inner bar and main bar in response to pushing the inner bar axially inwardly, to a locking position locking the weights against the end of the main bar, and being capable of being threaded outwardly to release the weights.

2. An adjustable dumbbell according to claim 1 wherein,
the main bar and the inner bar have interengaging buttress threads, and the thread on one of them is yieldable radially, enabling movement of the inner bar axially inwardly, but requiring threading action to remove the inner bar therefrom.

3. An adjustable dumbbell according to claim 2 wherein,
the inner bar is generally cylindrical in shape and of a diameter to have a sliding fit with the inner edge of the thread in the main bar, and the thread on the inner bar is of no greater circumferential extent that 180° whereby to enable it to move radially, means yieldingly biasing the thread on the inner bar outwardly, and the main bar has a stop element adjacent its outer end engageable by the thread on the inner bar and normally preventing withdrawal of the inner bar from the main bar, and the main bar having conformation enabling insertion of a probe for releasing the thread on the inner bar for enabling withdrawal of the inner bar.

4. An adjustable dumbbell according to claim 1 wherein,
the main bar includes a stop element at the center limiting inward movement of both the inner bars.

5. An adjustable dumbbell according to claim 1 wherein,
the inner bar includes a shank having a polygonal element at its outer end, and
the marginal edge of the central hole in the locking collar defining an outwardly facing socket capable of receiving said polygonal element in wrench-like position whereby to enable the locking collar to function as a wrench for turning the inner bar, and the polygonal element and socket having substantially equal axial dimension.

6. An adjustable dumbbell according to claim 1 wherein,
the weights are of predetermined thickness, and the inner bar has a range of movement axially into the main bar, and into locking position throughout that range, that is a multiple of thickness of a weight,
whereby a selective number of such weights can be mounted and secured in position.

7. An adjustable dumbbell according to claim 1 wherein,
the main bar has a regular and smooth contour throughout its length.

8. Mounting means for mounting a member forming a central hole to a support, comprising,
a support having a front face against which the member engages, and a recess opening through that front face, the member being positionable against said front face with the hole in register with the recess, and
locking means including a continuous and rigid main bar and an inner bar, the inner bar including a shank insertable into the recess and having a polygonal head on its outer surface, the polygonal head being dimensioned for passing through the hole in the member, and the main bar having a central hole sized to receive said polygonal head therethrough, and the marginal edge of the hole defining an outwardly facing socket capable of receiving said polygonal head in wrench-like position and whereby to the main bar to function as a wrench for turning the inner bar, and the inner bar and the surface of the recess having interlocking elements capable, in response to manipulation of the main bar, of releasably locking the member to the support,
one of the members having a continuous thread made up of buttress teeth having inclined surfaces facing axially outwardly and radially straight surfaces facing axially inwardly, and
the inner bar having a insert tooth, yieldable radially, capable of snapping past the teeth in response to sliding the inner bar axially inwardly, but necessitating rotationally threading the inner bar to withdraw it axially outwardly.

9. Mounting means according to claim 8 wherein,
the continuous thread is on the outer member, and the insert tooth is on the inner member.

10. Mounting means according to claim 9 wherein,
the teeth on the continuous thread on the outer member have radially inner flat surfaces defining a cylindrical surface engaged by the inner member.

* * * * *